(12) United States Patent
Hodge et al.

(10) Patent No.: US 9,784,325 B2
(45) Date of Patent: Oct. 10, 2017

(54) ROLLER ONE WAY CLUTCH CAGE RETENTION

(71) Applicant: Schaeffler Technologies AG & Co. KG, Herzogenaurach (DE)

(72) Inventors: Michael Hodge, Creston, OH (US); Matthew Frary, Burbank, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 15/058,555

(22) Filed: Mar. 2, 2016

(65) Prior Publication Data
US 2017/0254373 A1    Sep. 7, 2017

(51) Int. Cl.
*F16D 43/00*    (2006.01)
*F16D 41/067*    (2006.01)

(52) U.S. Cl.
CPC .... *F16D 41/067* (2013.01); *F16D 2200/0004* (2013.01); *F16D 2250/0084* (2013.01); *F16D 2300/12* (2013.01)

(58) Field of Classification Search
CPC ............... F16D 41/067; F16D 2300/12; F16D 2200/0004; F16D 2250/0084
See application file for complete search history.

(56) References Cited

U.S. PATENT DOCUMENTS

| 4,953,353 | A | | 9/1990 | Lederman | |
|---|---|---|---|---|---|
| 6,006,881 | A | * | 12/1999 | Lederman | F16D 41/067 192/113.32 |
| 6,092,634 | A | * | 7/2000 | Kremer | F16C 33/46 192/38 |
| 6,302,252 | B1 | * | 10/2001 | Iga | F16D 41/067 192/41 A |
| 9,145,927 | B2 | | 9/2015 | Luipold et al. | |
| 2002/0050433 | A1 | * | 5/2002 | Calve | F16D 41/06 192/45.1 |
| 2004/0110593 | A1 | * | 6/2004 | Szalony | F16H 3/54 475/149 |
| 2005/0217959 | A1 | * | 10/2005 | Iga | F16D 41/067 192/45.012 |
| 2016/0017936 | A1 | * | 1/2016 | Reimchen | F16D 41/067 192/45.004 |
| 2016/0215826 | A1 | * | 7/2016 | Reimchen | F16D 41/067 |

* cited by examiner

*Primary Examiner* — David J Hlavka
(74) *Attorney, Agent, or Firm* — Volpe and Koenig, P.C.

(57) ABSTRACT

A one way clutch with improved cage retention is disclosed. The assembly includes a housing with an opening having a first ramped portion defined on an inner periphery of the opening and a groove. A cage defines a plurality of rolling element pockets, and includes a first rim with a second ramped portion that corresponds to the first ramped portion. The first ramped portion of the housing is aligned with the second ramped portion of the cage during insertion of the cage into the opening of the housing for axial alignment of the second ramped portion and the groove. The cage is then rotated with respect to the housing such that the second ramped portion overlaps the first ramped portion to retain the cage in the housing.

8 Claims, 10 Drawing Sheets

ROLLER ONE WAY CLUTCH CAGE RETENTION

FIELD OF INVENTION

The present invention relates to a one way clutch assembly and is more particularly related to retention of a cage that holds rollers for a one way clutch assembly.

BACKGROUND

One way clutch assemblies are used in a wide variety of applications. One type of clutch assembly is a one way clutch assembly that includes rolling elements that are engaged by correspond ramped portions of an outer housing. This configuration allows a first component of the assembly to freely rotate with respect to a second component of the assembly in a first rotational direction. In a second, opposite rotational direction, the rolling elements lock up and the first component transmits torque to the second component.

A cage or other type of retention element is typically required to keep the rolling elements in position and aligned with the corresponding ramped portions during operation. Different configurations for retaining rolling elements in clutch assembles are disclosed, for example in U.S. Pat. No. 4,953,353 and U.S. Pat. No. 9,145,927. Known solutions for retention of cages with rolling elements in one way clutch assemblies include side plates or drawn cup stampings with flanges. These solutions require additional space and/or additional components.

It would be desirable to provide a simple, cost effective way to retain a rolling element cage along with the associated rolling elements in a one-way clutch assembly.

SUMMARY

A one way clutch assembly with improved cage retention is provided. The assembly includes a housing with an opening having a first ramped portion and a groove defined on an inner periphery of the opening. A cage defines a plurality of rolling element pockets, and includes a first rim with a second ramped portion that corresponds to the first ramped portion. The first ramped portion of the housing is aligned with the second ramped portion of the cage during insertion of the cage into the opening of the housing for axial alignment of the second ramped portion and the groove. The cage is then rotated with respect to the housing such that the second ramped portion overlaps the first ramped portion to retain the cage in the housing.

BRIEF DESCRIPTION OF THE DRAWINGS

The foregoing Summary and the following detailed description will be better understood when read in conjunction with the appended drawings, which illustrate a preferred embodiment of the invention. In the drawings.

DETAILED DESCRIPTION OF THE PREFERRED EMBODIMENTS

Figure 1:
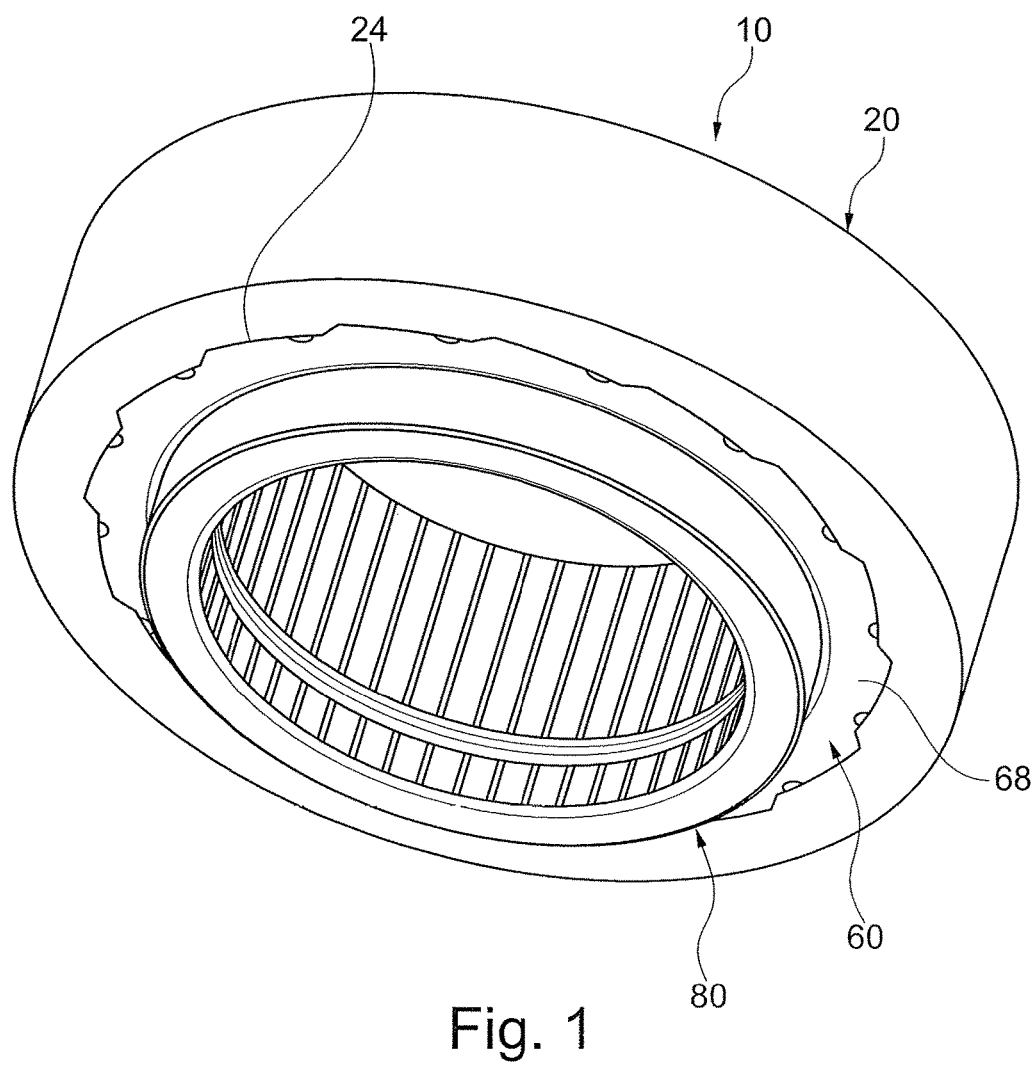
FIG. 1 is a perspective view of one way clutch assembly according to a first embodiment of the invention.
Figure 2A:
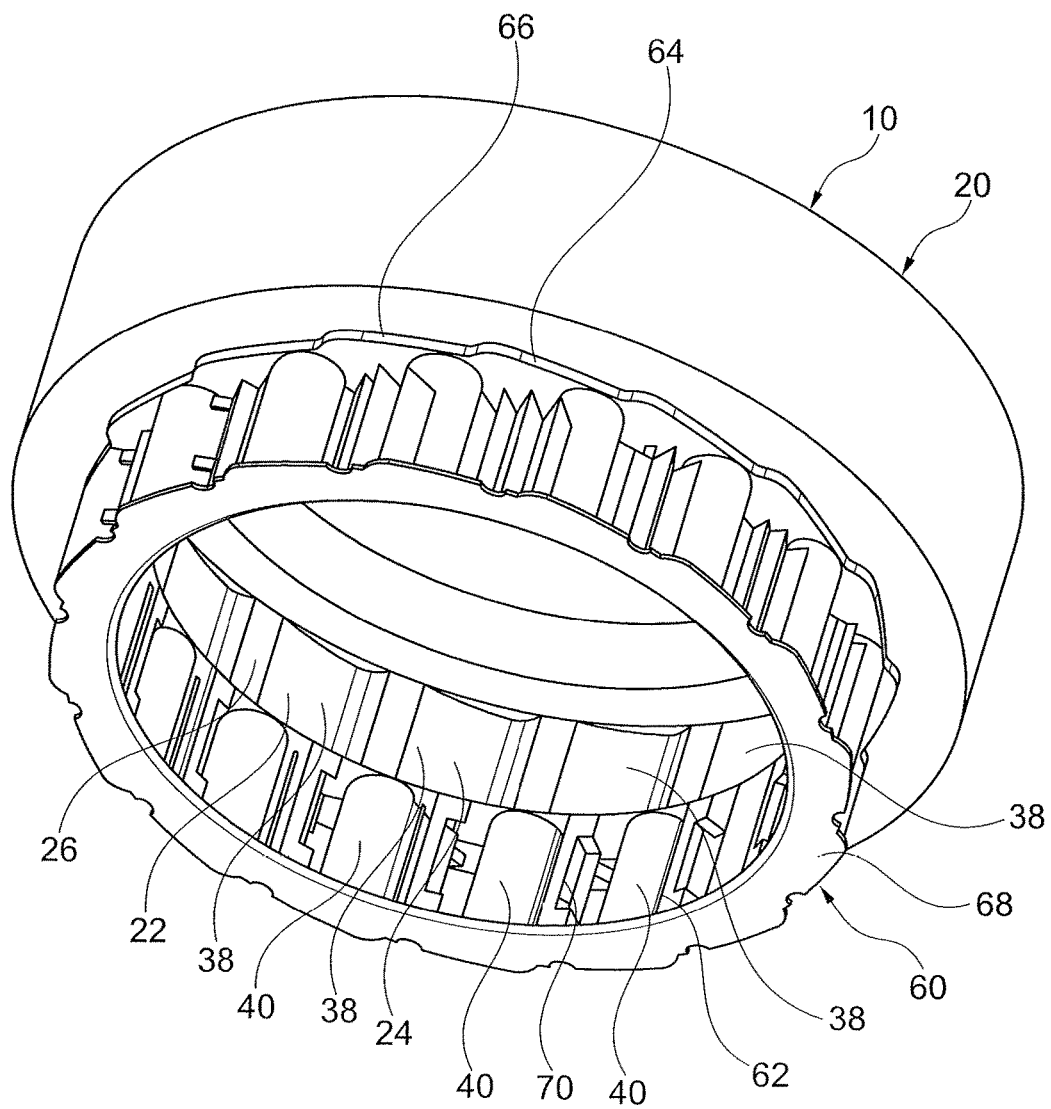
FIG. 2A is a perspective view of the one way clutch assembly of FIG. 1 prior to insertion of a cage into a housing.
Figure 2B:
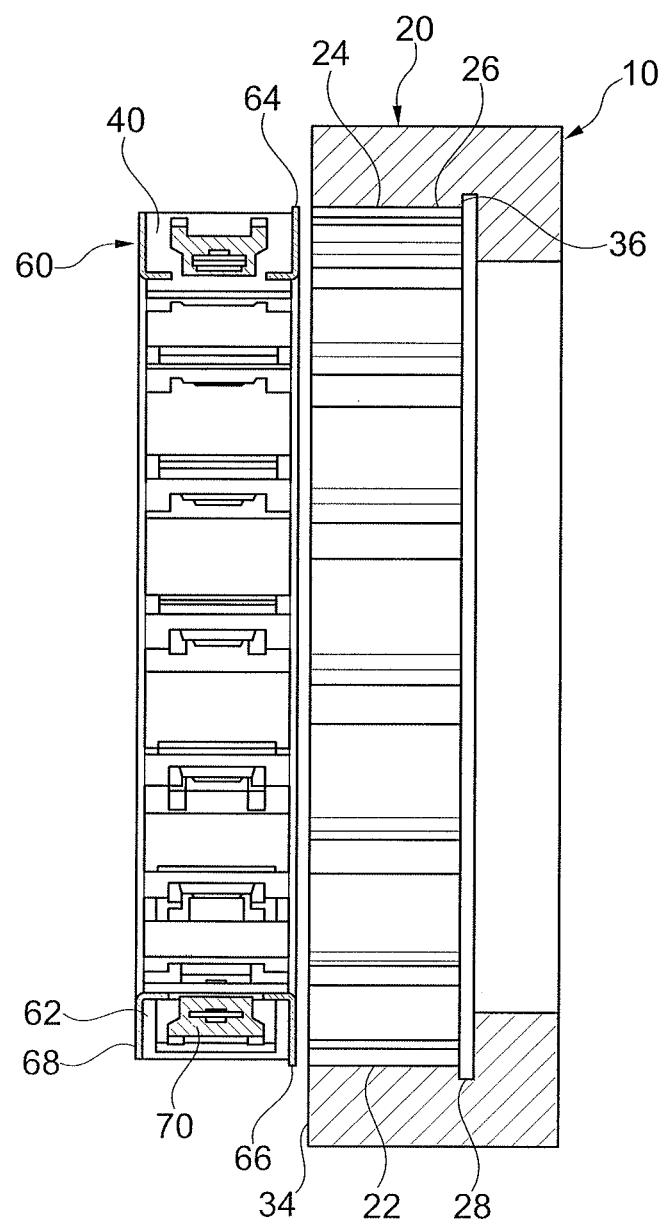
FIG. 2B is a cross sectional view of the one way clutch assembly of FIG. 2A prior to insertion of the cage into the housing.

Certain terminology is used in the following description for convenience only and is not limiting. The words "front," "rear," "upper," and "lower" designate directions in the drawings to which reference is made. The words "inwardly" and "outwardly" refer to directions toward and away from the parts referenced in the drawings. "Axially" refers to a direction along the axis of a shaft or rotating part. A reference to a list of items that are cited as "at least one of a, b, or c" (where a, b, and c represent the items being listed) means any single one of the items a, b, or c, or combinations thereof. The terminology includes the words specifically noted above, derivatives thereof and words of similar import.

FIGS. 1-4C show a first embodiment of a one way clutch assembly 10 including a housing 20, rolling elements 40, a cage 60, and an inner supported member 80. As shown in FIGS. 2A and 2B, the housing 20 includes an opening 22, a first ramped portion 24 defined on an inner periphery 26 of the opening 22, and a groove 28. As shown in FIGS. 2A, 3C, 4B, and 4C the first ramped portion 24 of the housing 20 preferably includes a plurality of ramps 38. During operation, the first ramped portion 24 of the housing 20 is configured to allow the inner supported member 80, which is typically a shaft, to rotate freely about a rotational axis (X) in a first relative rotational direction R1 (illustrated in FIG. 4C) with respect to the housing 20. In an opposite, second relative rotational direction R2 (shown in FIG. 4C), the rolling elements 40 lock up by moving radially inwardly along the ramps 38, thereby allowing torque to be transmitted between the inner supported member 80 and the housing 20.

Figure 3A:
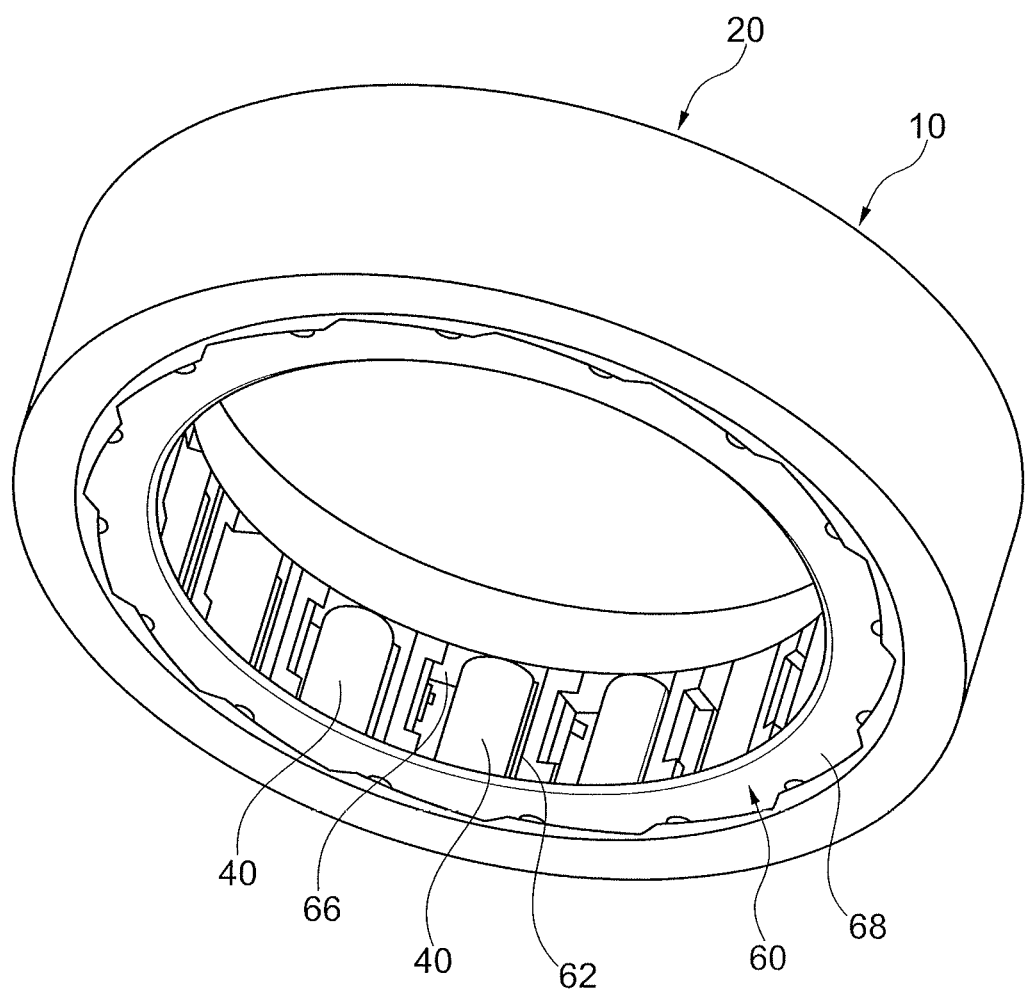
FIG. 3A is a perspective view of the one way clutch assembly of FIG. 1 after insertion of the cage into the housing but prior to installation with an inner supported member.
Figure 3B:
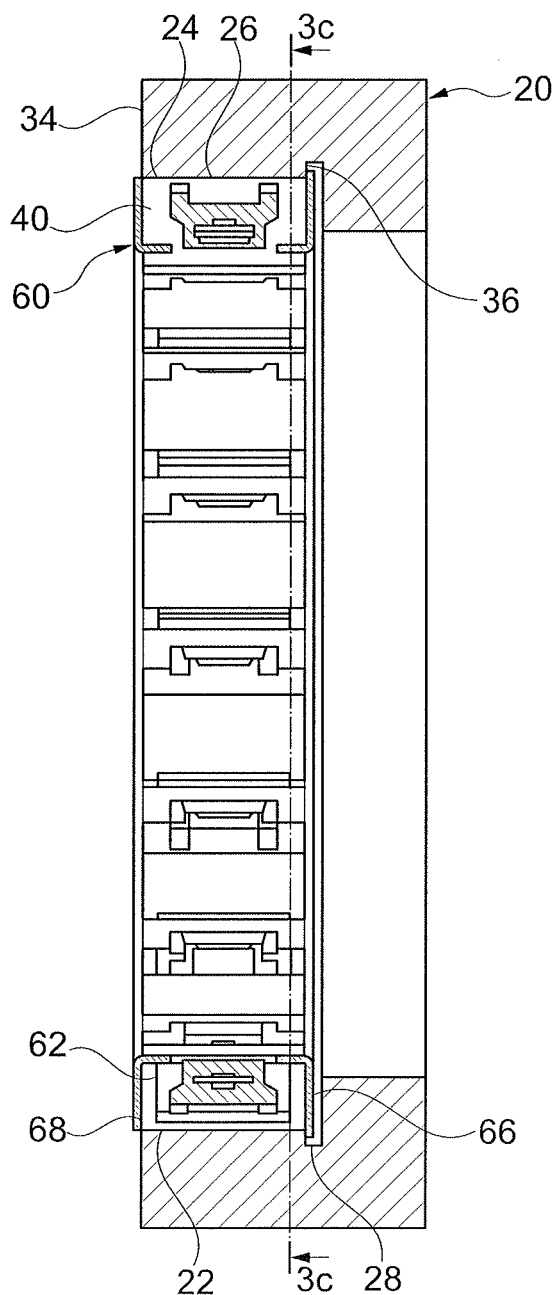
FIG. 3B is a cross sectional view of the one way clutch assembly of FIG. 3A.
Figure 3C:
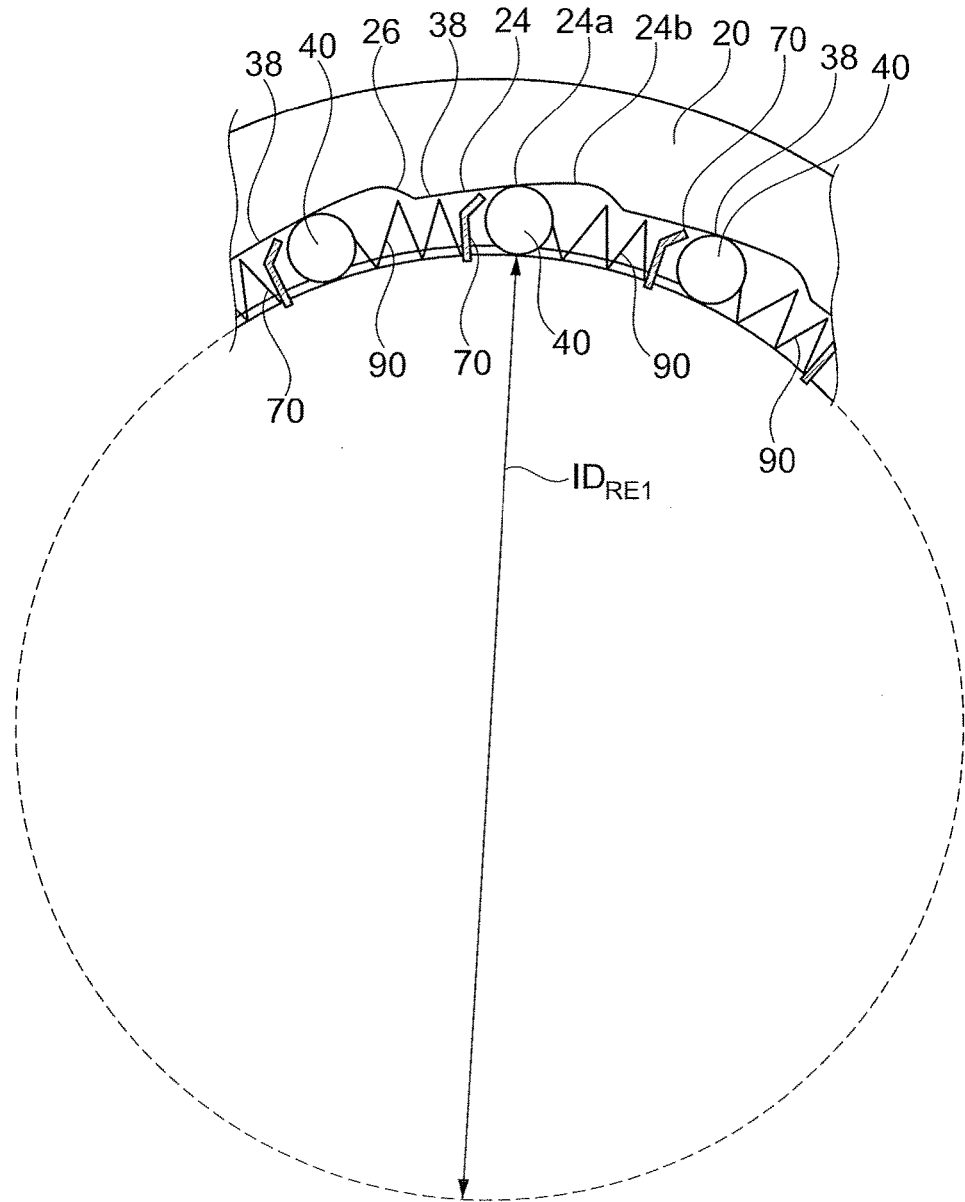
FIG. 3C is a planar view of a portion of the housing and the cage along line 3C-3C from FIG. 3B.
Figure 4A:
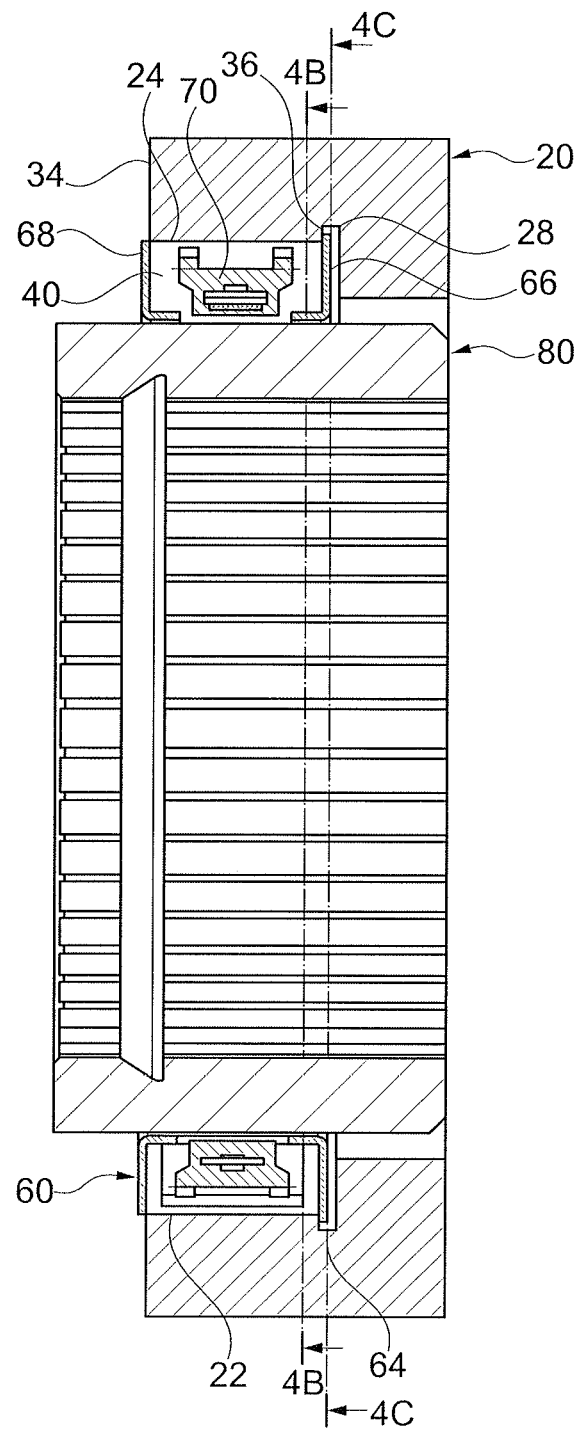
FIG. 4A is a cross sectional view of the one way clutch assembly of FIG. 1 after installation of the cage and housing with an inner supported member.
Figure 4B:
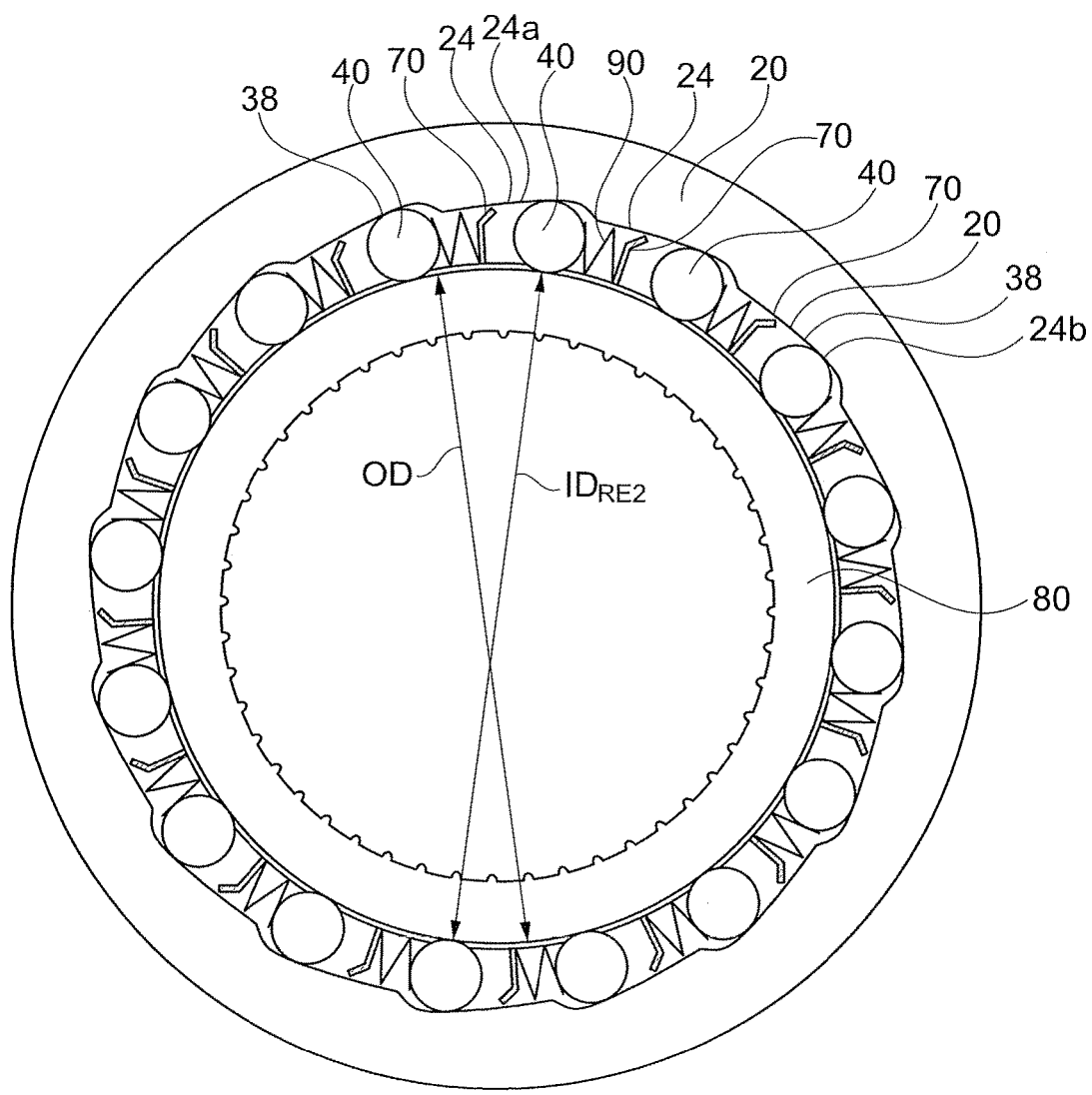
FIG. 4B is a planar view along line 4B-4B from FIG. 4A.
Figure 4C:
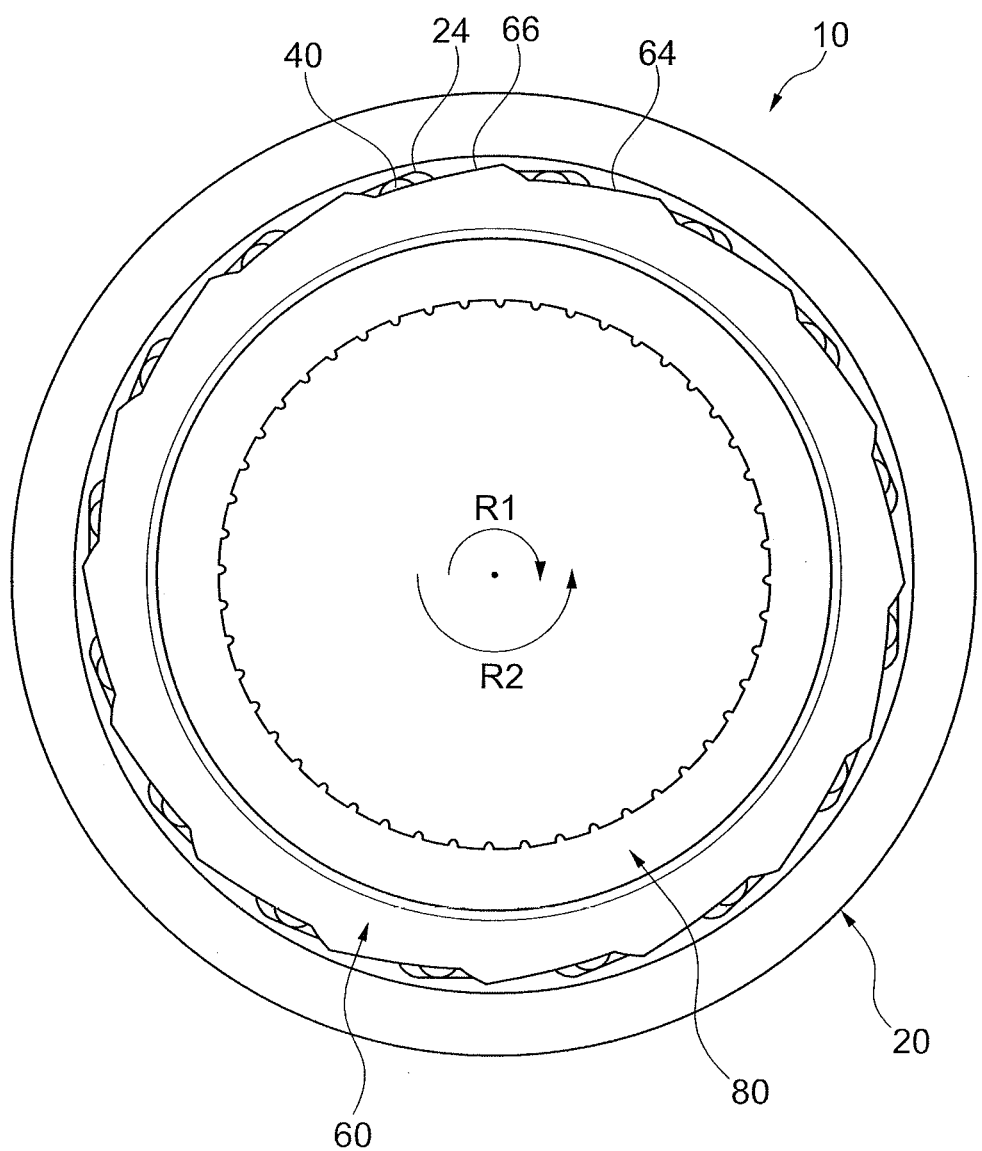
FIG. 4C is a planar view along line 4C-4C from FIG. 4A.

The cage 60 retains the rolling elements 40 and keeps the rolling elements 40 aligned with the first ramped portion 24 of the housing 20 with one rolling element 40 preferably located on each ramp 38. The cage 60 is preferably formed from sheet metal. One of ordinary skill in the art would recognize from the present disclosure that other formation methods could be used to form the cage 60. The cage 60 defines a plurality of rolling element pockets 62 adapted to receive the rolling elements 40, and includes a first rim 66 with a second ramped portion 64 that corresponds to the first ramped portion 24. In one embodiment, the cage 60 includes a second rim 68, and a plurality of webs 70 extend between the first rim 66 and the second rim 68 to define the plurality of rolling element pockets 62. As shown in FIGS. 3C and 4B, a biasing member 90 is preferably provided in each of the rolling element pockets for biasing the rolling elements 40 into contact with the housing 20. The biasing member 90 is preferably a spring.

To assemble the cage 60 with the housing 20, preferably the rolling elements 40 are located in the cage 60. The first ramped portion 24 of the housing 20 and the second ramped portion 64 of the cage 60 are aligned. Then, the cage 60 is inserted into the opening 22 of the housing 20 until the second ramped portion 64 is axially aligned with the groove 28. Once the cage 60 is inserted into the housing 20, the cage 60 is then rotated with respect to the housing 20 so the second ramped portion 64 overlaps the first ramped portion 24 to retain the cage 60 in the housing 20. The first rim 66 of the cage 60 being received within the groove 28 of the housing 20 and rotated after insertion of the cage 60 into the opening 22 provides that the cage 60 is positively retained within the housing 20. Any axial movement of the cage 60 with respect to the housing 20 is prevented due to the first rim 66 of the cage 60 contacting an axial retention surface 36 defined by the groove 28 of the housing 20. As shown in FIGS. 3B and 4A, preferably the second rim 68 contacts an axial end face 34 of the housing 20 in an assembled state after the cage 60 is installed within the housing 20.

One of ordinary skill in the art will recognize from the present disclosure that the degree of rotation of the cage 60 within the housing 20 is dependent upon corresponding lengths and positions of the ramps 38 of the first ramped portion 24 and the second ramped portion 64. The first ramped portion 24 and the second ramped portion 64 each preferably include 16 ramps 38. One of ordinary skill in the art will recognize from the present disclosure that any number of rolling elements 40 and ramps could be used.

As shown in FIG. 3C, after insertion of the cage 60 with respect to the housing 20 but prior to rotation of the cage 60, the rolling elements 40 are engaged with a first region 24a of the first ramped portion 24 of the housing 20 based on a preload from the biasing member 90. This configuration corresponds to a pre-installed state. In this first region 24a of the first ramped portion 24, the rolling elements 40 define a first inner diameter $ID_{RE1}$ as shown in FIG. 3C. As the cage 60 is rotated with respect to the housing 20 in order to shift it into the retained position, the rolling elements 40 slide radially outwardly along the first ramped portion 24 to a second region 24b of the first ramped portion 24, as shown in FIG. 4B. In this second region 24b of the first ramped portion 24, the rolling elements 40 have moved outwardly due to biasing of the biasing member 90 and define a second inner diameter $ID_{RE2}$, shown in FIG. 4B, which is greater than the first inner diameter $ID_{RE1}$. As shown in FIG. 4B, the cage 60 and the housing 20 are arranged on the inner supported member 80, which corresponds to an installed state. An outer diameter OD of the inner supported member 80 is greater than the first inner diameter $ID_{RE1}$ of the rolling elements 40, and less than or equal to the second inner diameter $ID_{RE2}$ of the rolling elements 40. In the installed state, the rolling elements 40 are prevented from returning to the first region 24a due to the inner supported member 80. This configuration limits rotation of the cage 60 within the housing 20 and ensures that the cage 60 cannot rotate back to the pre-installed position (i.e. the rolling elements 40 cannot return to the first region 24a) as long as the cage 60 is arranged on the inner supported member 80.

Figure 5:
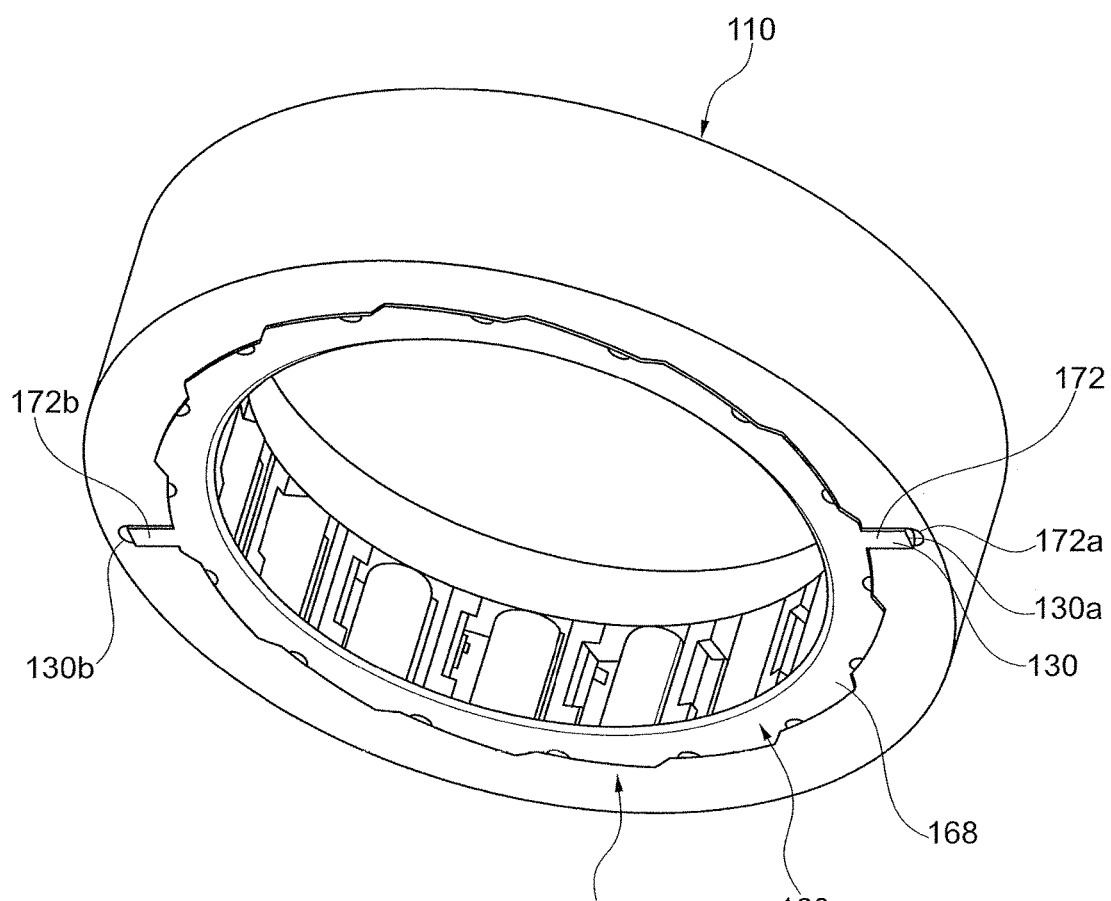
FIG. 5 is a perspective view of a partially assembled one way clutch assembly according to a second embodiment of the invention.

A second embodiment of the one way clutch assembly 110 is shown in FIG. 5. The second embodiment 110 is the same as the first embodiment and the structure is the same except for the differences expressly noted below. Here, the cage 160, which otherwise corresponds to the cage 60, includes a second rim 168 having an outwardly extending tab 172, and the housing 120, which otherwise corresponds to the housing 20, includes a retention cavity 130 that receives the outwardly extending tab 172 of the second rim 168. Once the cage 160 is positioned within the housing 120, the cage 160 is then rotated until the outwardly extending tab 172 is bent or snaps into position within the retention cavity 130 of the housing 120. The outwardly extending tab 172 and the retention cavity 130 provide a predetermined rotational position setting for the cage 160 with respect to the housing 120. The second rim 168 of the cage 160 preferably includes two outwardly extending tabs 172a, 172b that are diametrically opposed to one another, and the housing 120 preferably includes two retention cavities 130a, 130b that are diametrically opposed to one another. The two retention cavities 130a, 130b of the housing 120 each receive a respective one of the two outwardly extending tabs 172a, 172b of the second rim 168. One of ordinary skill in the art will recognize from the present disclosure that alternative configurations of the outwardly extending tabs 172a, 172b and retention cavities 130a, 130b could be used.

A method for retaining a cage 60 in a one way clutch assembly 10 is also provided. The method includes providing a housing 20 with an opening 22 having a first ramped portion 24 with one or more ramps 38 and a groove 28 defined on an inner periphery 26 of the opening 22. The method includes providing a cage 60 defining a plurality of rolling element pockets 62 and including a first rim 66 with a second ramped portion 64 that corresponds to the first ramped portion 24. The method includes aligning the first ramped portion 24 of the housing 20 and the second ramped portion 64 of the cage 60, and then inserting the cage 60 into the opening 22 of the housing 20. Once the cage 60 is inserted into the opening 22, the method includes aligning the second ramped portion 64 of the cage 60 with the groove 28 in an axial direction, and rotating the cage 60 with respect to the housing 20 so that the second ramped portion 64 overlaps the first ramped portion 24 to retain the cage 60 in the housing 20.

Having thus described the present invention in detail, it is to be appreciated and will be apparent to those skilled in the art that many physical changes, only a few of which are exemplified in the detailed description of the invention, could be made without altering the inventive concepts and principles embodied therein. It is also to be appreciated that numerous embodiments incorporating only part of the preferred embodiment are possible which do not alter, with respect to those parts, the inventive concepts and principles embodied therein. The present embodiment and optional configurations are therefore to be considered in all respects as exemplary and/or illustrative and not restrictive, the scope of the invention being indicated by the appended claims rather than by the foregoing description, and all alternate embodiments and changes to this embodiment which come within the meaning and range of equivalency of said claims are therefore to be embraced therein.

What is claimed is:

1. A one way clutch assembly comprising:
    a housing with an opening having a first ramped portion and a groove defined on an inner periphery of the opening; and
    a cage defining a plurality of rolling element pockets and including a first rim with a second ramped portion that corresponds to the first ramped portion, the first ramped portion of the housing is aligned with the second ramped portion of the cage during insertion of the cage into the opening of the housing for axial alignment of the second ramped portion and the groove, and upon rotation of the cage with respect to the housing, the second ramped portion overlaps the first ramped portion to retain the cage in the housing, wherein the cage includes a second rim having a first outwardly extending tab, and the housing includes a first retention cavity that receives the first outwardly extending tab of the second rim.

2. The one way clutch assembly of claim 1, wherein the cage includes a second rim, and a plurality of webs extend between the first rim and the second rim to define the plurality of rolling element pockets.

3. The one way clutch assembly of claim 1, wherein the first rim of the cage is received within the groove of the housing after insertion of the cage into the opening.

4. The one way clutch assembly of claim 1, wherein the cage is formed from sheet metal.

5. The one way clutch assembly of claim 1, wherein the second rim of the cage includes a second outwardly extending tab that is diametrically opposed to the first outwardly extending tab, the housing includes a second retention cavity that is diametrically opposed to the first retention cavity, and the two retention cavities of the housing each receive a respective one of the two outwardly extending tabs of the second rim.

6. The one way clutch assembly of claim 1, wherein the first ramped portion and the second ramped portion each include at least one ramp.

7. A one way clutch assembly comprising:
a housing with an opening having a first ramped portion and a groove defined on an inner periphery of the opening; and
a cage defining a plurality of rolling element pockets and including a first rim with a second ramped portion that corresponds to the first ramped portion, the first ramped portion of the housing is aligned with the second ramped portion of the cage during insertion of the cage into the opening of the housing for axial alignment of the second ramped portion and the groove, and upon rotation of the cage with respect to the housing, the second ramped portion overlaps the first ramped portion to retain the cage in the housing, further comprising rolling elements arranged within the plurality of rolling element pockets of the cage, and an inner supported member having an outer diameter, wherein:
(1) in a pre-installed state, the rolling elements engage a first region of the first ramped portion of the housing, and the rolling elements define a first inner diameter; and
(2) in an installed state, the cage is rotated with respect to the housing to move the rolling elements outwardly along the first ramped portion to a second region of the first ramped portion of the housing, the cage and the housing are then arranged on the inner supported member, and the outer diameter of the inner supported member is greater than the first inner diameter of the rolling elements such that the rolling elements are prevented from returning to the first region of the first ramped portion of the housing.

8. A method for retaining a cage in a one way clutch, the method comprising:
providing a housing with an opening having a first ramped portion and a groove defined on an inner periphery of the opening;
providing a cage defining a plurality of rolling element pockets and including a first rim with a second ramped portion that corresponds to the first ramped portion, wherein the cage includes a second rim having a first outwardly extending tab, and the housing includes a first retention cavity that receives the first outwardly extending tab of the second rim;
aligning the first ramped portion of the housing and the second ramped portion of the cage;
inserting the cage into the opening of the housing;
aligning the second ramped portion of the cage with the groove in an axial direction; and
rotating the cage with respect to the housing so that the second ramped portion overlaps the first ramped portion to retain the cage in the housing.

* * * * *